United States Patent
Drupsteen et al.

(10) Patent No.: US 6,249,869 B1
(45) Date of Patent: *Jun. 19, 2001

(54) INTEGRATED CIRCUIT CARD, SECURE APPLICATION MODULE, SYSTEM COMPRISING A SECURE APPLICATION MODULE AND A TERMINAL AND A METHOD FOR CONTROLLING SERVICE ACTIONS TO BE CARRIED OUT BY THE SECURE APPLICATION MODULE ON THE INTEGRATED CIRCUIT CARD

(75) Inventors: Michel Marco Paul Drupsteen, Alkmaar; Albertus Feiken, Amstelveen, both of (NL)

(73) Assignee: Koninklijke KTN N.V., Groningen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,186

(22) Filed: Jul. 10, 1997

(30) Foreign Application Priority Data

Jul. 12, 1996 (EP) .................................................. 96201967
Oct. 11, 1996 (EP) .................................................. 96202832

(51) Int. Cl.[7] .............................. H04L 9/00; H04K 1/00; G06F 17/60; G06K 5/00
(52) U.S. Cl. ............................ 713/172; 705/65; 713/165; 235/379; 235/380
(58) Field of Search ............................. 380/24; 713/172; 705/65

(56) References Cited

U.S. PATENT DOCUMENTS 4,804,825 * 2/1989 Bitoh ....................................... 380/24
4,837,422 6/1989 Dethloff et al. .
4,985,920 * 1/1991 Seki ........................................ 380/24

(List continued on next page.)

FOREIGN PATENT DOCUMENTS

| 41 26 213 | * 2/1993 | (DE) . |
|---|---|---|
| 0262025 A2 | 3/1988 | (EP) . |
| 0640945 A2 | 3/1995 | (EP) . |
| 0644513 A2 | 3/1995 | (EP) . |
| 0661675 A2 | 7/1995 | (EP) . |
| 0 674 2390 A2 | 9/1995 | (EP) . |
| 2 640 783 | * 6/1990 | (FR) . |
| WO 87/07060 | 11/1987 | (WO) . |
| WO 87/07061 | 11/1987 | (WO) . |
| WO 92/06451 | * 4/1992 | (WO) . |

OTHER PUBLICATIONS

The Microsoft Press Computer Dictionary, 3rd ed., 1997 p. 223.*

Primary Examiner—Tod Swann
Assistant Examiner—Douglas Meislahn
(74) Attorney, Agent, or Firm—Frishauf, Holtz, Goodman, Langer & Chick, P.C.

(57) ABSTRACT

An integrated circuit card includes a memory storing service data relating to at least one service. At least part of the memory comprises data in file structures within one directory including at least a first file and a second file. The service data is grouped together in at least one service slot. Each service slot is divided into a profile part and a data part. Each profile part has a slot number and is arranged to function as an authorization mechanism. Each profile part is stored in the first file and comprises a unique application identifier. Each data part is at least partly stored in the second file and comprises data related to a given service. And the memory stores at least one key to protect write access to the first and second files. A secure application module and a terminal are also provided for controlling service actions to be carried out by the terminal on the integrated circuit card.

15 Claims, 12 Drawing Sheets

U.S. PATENT DOCUMENTS

| | | |
|---|---|---|
| 5,036,461 | 7/1991 | Elliott et al. . |
| 5,473,690 * | 12/1995 | Grimonprez et al. ............... 380/24 |
| 5,544,246 * | 8/1996 | Mandelbaum et al. ............. 380/24 |
| 5,578,808 * | 11/1996 | Taylor .................................. 235/380 |
| 5,608,902 * | 3/1997 | Iijima .................................. 707/200 |
| 5,617,568 * | 4/1997 | Ault et al. ........................... 707/101 |
| 5,689,701 * | 11/1997 | Ault et al. ........................... 707/10 |
| 5,748,737 * | 5/1998 | Daggar ................................ 380/24 |
| 5,748,740 * | 5/1998 | Curry et al. ......................... 380/25 |
| 5,940,510 * | 8/1999 | Curry et al. ......................... 380/25 |
| 5,953,419 * | 9/1999 | Lohstroh et al. .................... 380/21 |
| 6,038,551 * | 3/2000 | Barlow et al. ....................... 705/41 |

* cited by examiner

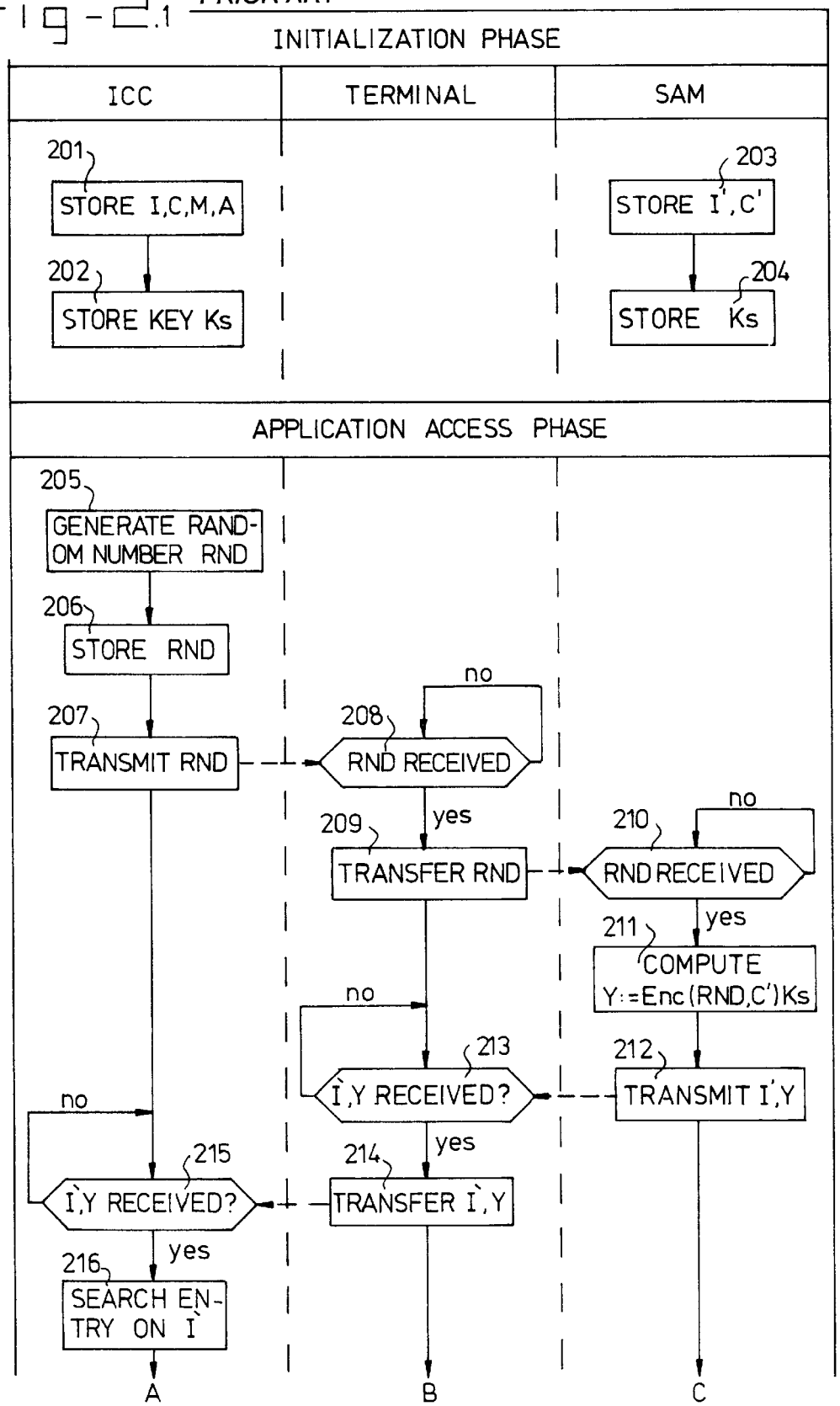

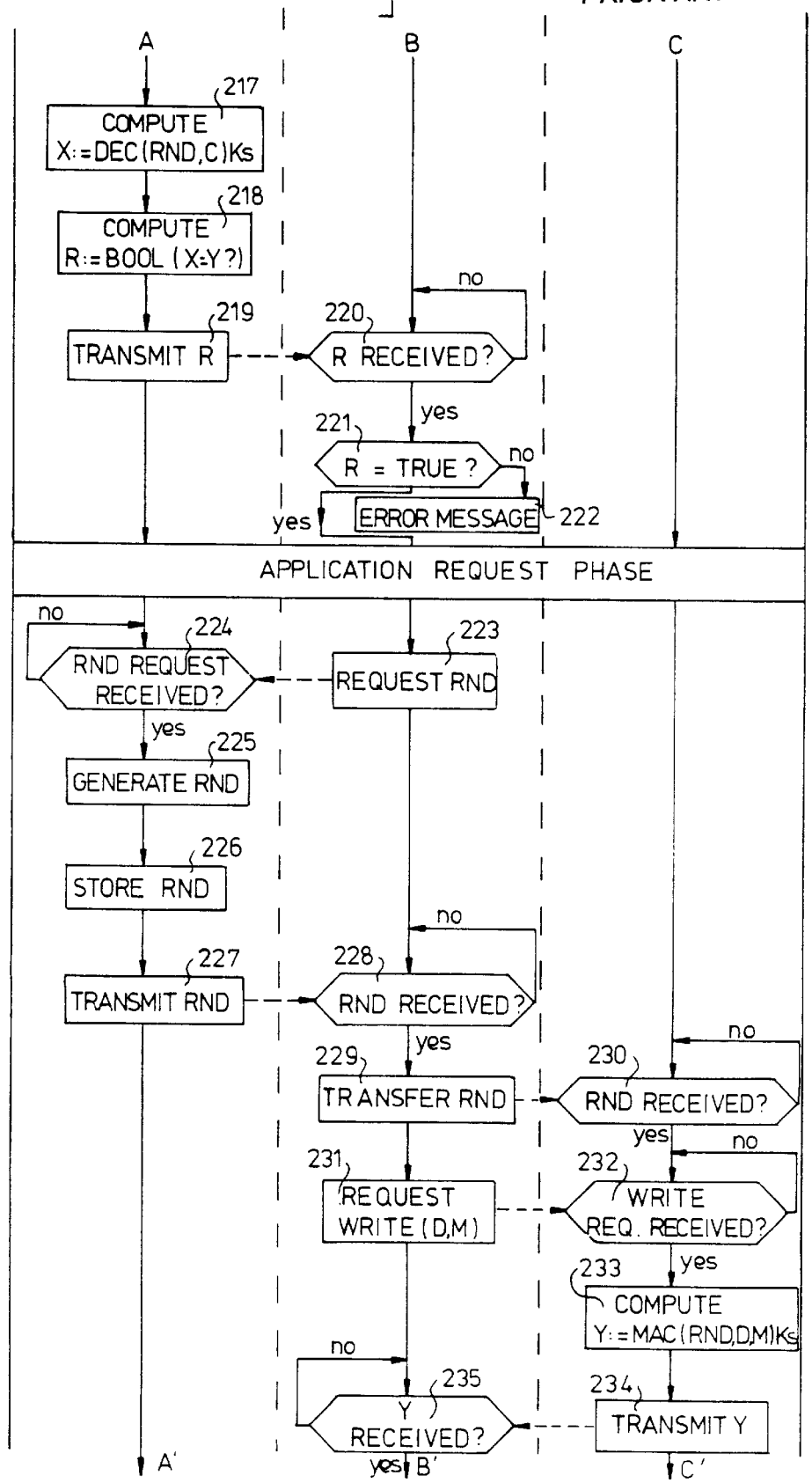

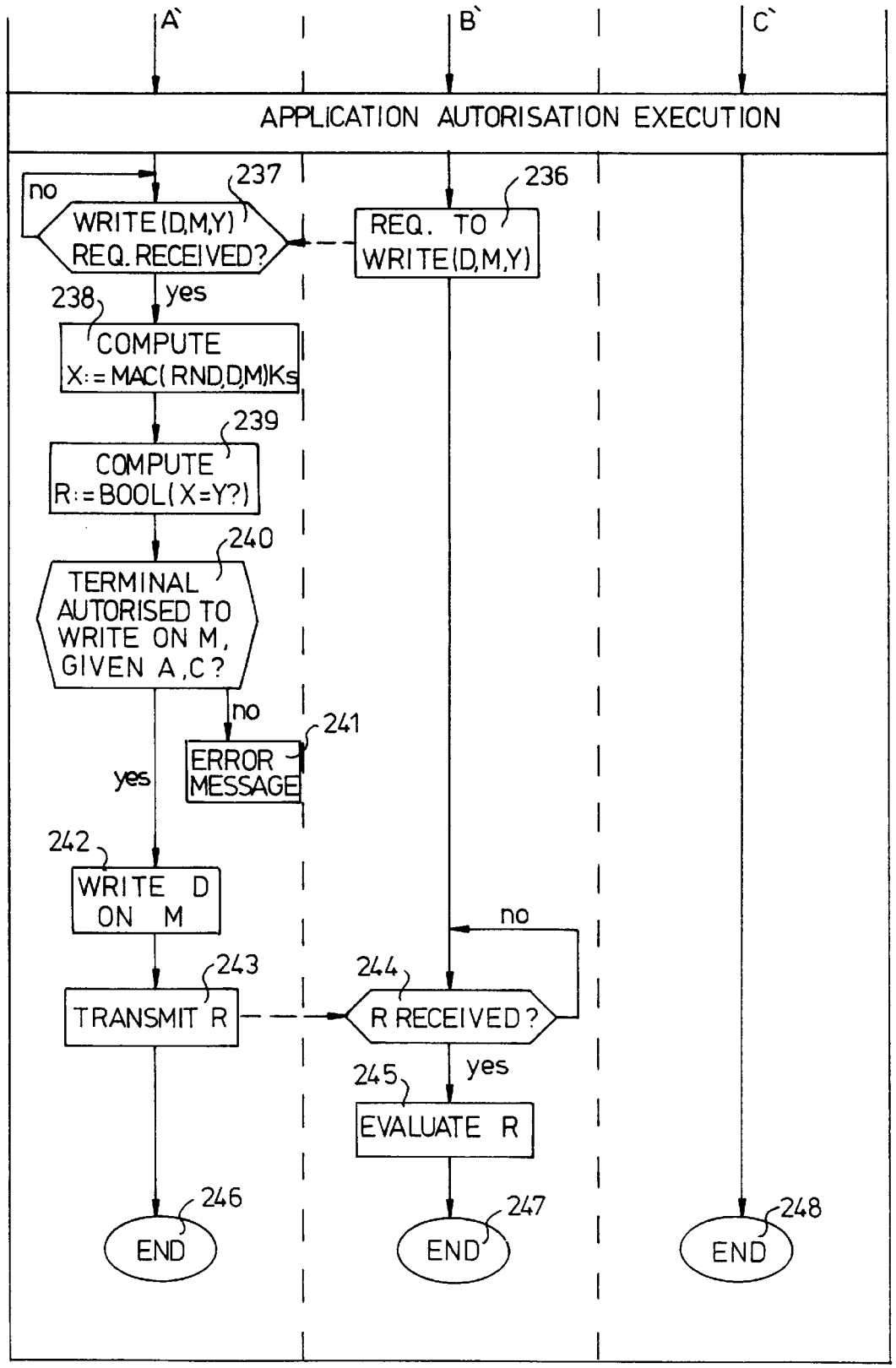
Fig-2.3 PRIOR ART

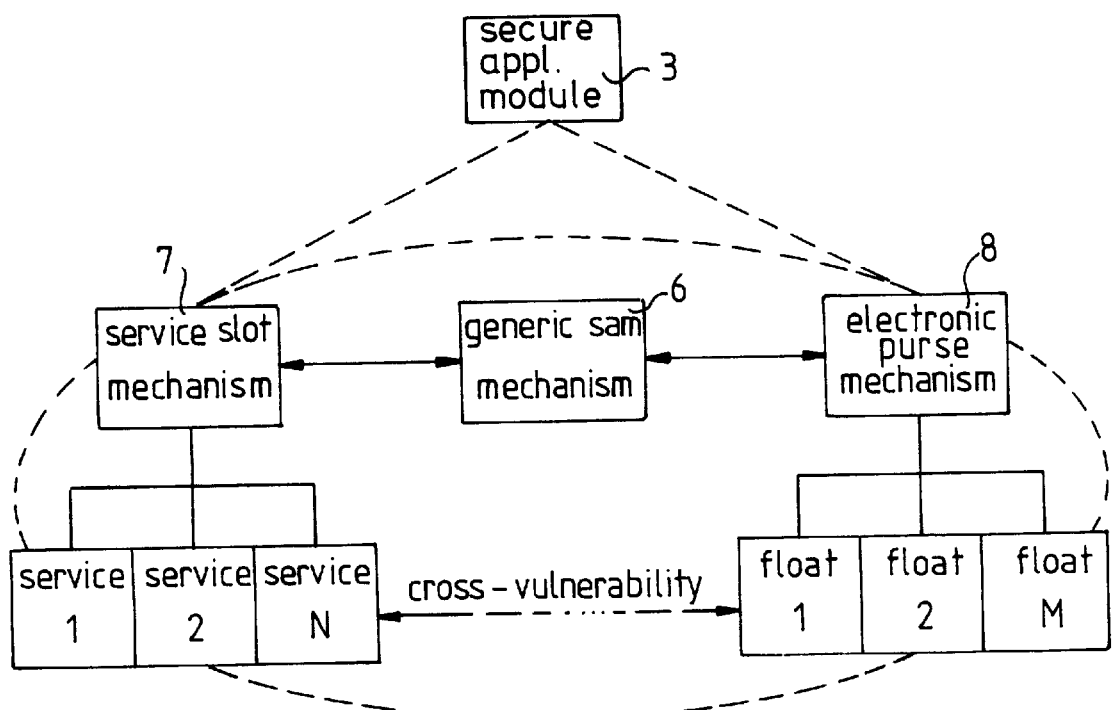

SAM SERVICE APPLICATION ENVIRONMENT

| INTEGRATED CIRCUIT CARD | TERMINAL | SECURE APPLICATION MODULE |
|---|---|---|
| INITIALIZATION | | |
| 801  LOAD KEY Ks1, Ks2<br>802  WRITE (C',S') Ks2 | | LOAD KEY Ks1, Ks2, Ksam<br>WRITE (C,S,A) Ksam |
| APPLICATION REQUEST & AUTHORIZATION | | |
| 803  get request<br>804  select correct file<br>805  get request<br>806  search for C' and S'<br>807  return RN'<br>808 | <== SELECT file-profile<br><br><== SEEK(C',S')<br><br>=>fetch RN'<br>check RN':=valid | |
| 809<br>810<br>811<br>812  get RND1<br>813  get request<br>814  comp Y:=MAC(RND1,RN',C')Ks1<br>815  return C',Y<br>816<br>817 | ASK RND1==><br><br><br><== GIVE RND1<br><== READ (RN')<br><br>==>fetch C',Y<br>VERIFY MAC(C',RN',Y)==> | get request<br>generate RND1<br>store RND1<br>return RND1<br><br><br><br>get C',RN',Y<br>store C',RN' |
| 818<br>819 | | comp R:=Bool(C'==C)<br>check R==true |
| 820 | | comp X:=MAC(RND1,RN'.C')Ks1 |
| 821<br>822 | | comp R:=Bool(X=Y)<br>check R==true |
| 823 | check R <== | return R |

FIG.8a(1)

| SERVICE ACTION REQUEST & AUTHORIZATION | | |
|---|---|---|
| 824 get request <== SELECT file-service | | |
| 825 select correct file | | |
| 826 get request <== ASK RND2 | | |
| 827 generate RND2 | | |
| 828 store RND2 | | |
| 829 return RND2   GIVE RND2 ==>   GET RND2 | | |
| 830   COMPUTE MAC(WRITE(S',D,RN'))==> get WRITE(S'.D,RN') | | |
| 831 | | comp R:=Bool(RN'==RN) |
| 832 | | check R==true |
| 833 | | comp R:=Bool(S'==S) |
| 834 | | check R==true |
| 835 | | comp R:=authorize (WRITE,C,S,A) |
| 836 | | check R==true |
| 837 | | comp X:=MAC(RND2,S,D,RN)Ks2 |
| 838 | fetch X <== | return X |
| 839 | check X==valid | |
| SERVICE ACTION EXECUTION | | |
| 840 get request <== WRITE(S,D,RN,X) | | |
| 841 comp Y:=MAC(RND2,S,D,RN)Ks2 | | |
| 842 comp R:=Bool(X==Y) | | |
| 843 check R==true | | |
| 844 fetch RN | | |
| 845 store S,D on RD | | |
| 846 return R | | |
| 847   ==>fetch R | | |
| | check R | |

FIG.8a(2)

| INTEGRATED CIRCUIT CARD | TERMINAL | SECURE APPLICATION MODULE |
|---|---|---|
| INITIALIZATION | | |
| 801   LOAD KEY Ks1, Ks2<br>802   WRITE (C',S') Ks2 | | LOAD KEY Ks1, Ks2, Ksam<br>WRITE (C,S,A) Ksam |
| APPLICATION REQUEST & AUTHORIZATION | | |
| 803<br>⋮      1 see figure 8a<br>823 | | |
| SERVICE ACTION REQUEST & AUTHORIZATION | | |
| 824   get request<br>825   select correct file | <== SELECT file-service | |
| 825a<br>825b<br>825c<br>825d   get RND3<br>825e   get request<br>825f   comp Y:=MAC(RND3,RN',S',D')Ks1<br>825g   return S',D',Y | ASK RND3==><br><br><br><== GIVE RND3<br><== READ (RN')<br><br>==>fetch S',D',Y<br>VERIFY MAC(S',D',RN',Y)==> | get request<br>generate RND3<br>store RND3<br>return RND3<br><br><br><br>get S',D',RN',Y |
| 825i<br>825j | | comp R:=Bool(S'==S)<br>check R==true |
| 825k<br>825l<br>825m | | store S',D',RN'<br>store D'.fixed<br>comp X:=MAC(RND3,S',D',RN')Ks1 |
| 825n<br>825o | | comp R:=Bool(X==Y)<br>check R==true |
| 825p | check R <== | return R |

FIG.8b(1)

| | | | |
|---|---|---|---|
| 826 | get request | <== ASK RND2 | |
| 827 | generate RND2 | | |
| 828 | store RND2 | | |
| 829 | return RND2 | GIVE RND2 ==> | GET RND2 |
| 830 | | COMPUTE MAC(WRITE(S',D.var,RN'))==> | get WRITE(S'.D.var,RN') |
| 831 | | | comp R:=Bool(RN'==RN) |
| 832 | | | check R==true |
| 833 | | | |
| 833 | | | comp R:=Bool(S'==S) |
| 834 | | | check R==true |
| 835 | | | |
| 835 | | | comp R:=authorize (WRITE,C,S,A) |
| 836 | | | check R==true |
| 837a | | | generate D:=D' fixed+D.var |
| 837b | | | comp X:=MAC(RND2,S,D,RN)Ks2 |
| 838 | | fetch X <== | return X |
| 839 | | check X==valid | |

SERVICE ACTION EXECUTION

| | | | |
|---|---|---|---|
| 840 | get request | <== WRITE(S,D,RN,X) | |
| 841 | comp Y:=MAC(RND2,S,D,RN)Ks2 | | |
| 842 | comp R:=Bool(X==Y) | | |
| 843 | check R==true | | |
| 844 | fetch RN | | |
| 845 | store S,D on RD | | |
| 846 | return R | ==>fetch R | |
| 847 | | check R | |

FIG.8b(2)

INTEGRATED CIRCUIT CARD, SECURE APPLICATION MODULE, SYSTEM COMPRISING A SECURE APPLICATION MODULE AND A TERMINAL AND A METHOD FOR CONTROLLING SERVICE ACTIONS TO BE CARRIED OUT BY THE SECURE APPLICATION MODULE ON THE INTEGRATED CIRCUIT CARD

BACKGROUND OF THE INVENTION

The present invention relates to an integrated circuit card provided with memory means storing service data relating to at least one service.

Such integrated circuit cards are now widely used. The present invention is intended to be used in multiple application authorization mechanisms. Examples of multiple application authorization mechanisms have been described before in, e.g., U.S. Pat. No. 5,473,690, WO-A-92/06451, EP-A-0,640,945, EP-A-0,644,513, WO-A-87/07060, EP-A-0,262,025 and EP-A-0,661,675.

These known multiple application authorization mechanisms share a direct memory access structure in which no directories and files are used. A common feature of the known mechanisms is to use a secret code to check whether a secure application module is allowed to access an application, indicated by a unique identifier, on the integrated circuit card. Whenever a secure application module wishes access to this application this secret code needs to be reproduced.

Since these known mechanisms do not use directories or file structures the presence of access tables on the integrated circuit cards is required. These access tables comprise several entries including the secret code for a predetermined application, the related memory locations on the integrated circuit card used for the predetermined application and the related access rights associated with the predetermined application such as, for example read/write rights, or a pin. Most importantly, a secret key is required to avoid disclosure of the secret code.

A disadvantage of the known mechanisms referred to above is that the access tables on the integrated circuit card occupy memory locations. Since nowadays an integrated circuit card only has about 8 kilobits of memory space available, this is a serious disadvantage.

SUMMARY OF THE INVENTION

The object of the present invention is to provide an integrated circuit card having a memory organized in a directory and file structure and in which memory space is saved by reducing the overhead data on the integrated circuit card per application.

To obtain this object the present invention provides an integrated circuit card wherein at least part of the memory means comprises service data in file structures within one directory comprising a first file and a second file, service data being grouped together in service slots, any service slot being divided into a profile part and a data part, any profile part having a slot number, and being stored in the first file and comprising a unique application identifier and any data part being stored in the second file and comprising data relating to the service, the memory means storing at least one key to protect write access to the first and second files.

By means of a memory on the integrated circuit card structured as defined above it is enough to store only one or two keys on the card which are common to several service applications. Thus, less overhead data relating to any of the service applications on the card is required and more service applications can be supported by the integrated circuit card.

In one embodiment, at least one profile part also comprises data relating to an expiry date of the service slot concerned. Such data relating to an expiry date may be checked by the secure application module which is communicating with the integrated circuit card. If it is established that the date has already expired the service slot concerned is available to any other new service application. Thus, no complicated arrangements have to be provided for between the hardware provider, the provider of the software and the party who is providing the service to the user of the integrated circuit card. The availability of a service slot of which the expiry date has expired can be checked automatically.

When there are different application providers of the software related to several services the service slots are preferably structured such that they comprise their own profile part and their own data part, the profile parts being implemented as records of the first file and the data parts being implemented as records of the second file, the memory means storing a further key to protect access to the first file. In such a case these service slots may be called "generic service slots".

However, when there is only one application provider of the software for several services, preferably the implemented service slots share one common profile part but any service slot comprises its own data part, the common profile part being implemented as one record of the first file and the data parts being implemented as separate records of the second file. These service slots may be called "dedicated service slots". In such a case, the first file only comprises one record, thus saving required memory space for the profile part data.

The directory of the integrated circuit card may be extended by a third file such that at least one service slot comprises an additional data part in the third file for storing additional data. Some service applications need a lot of additional data which may be stored in such an additional data part.

The present invention also relates to a secure application module equipped to communicate with an integrated circuit card, provided with memory means storing service data relating to at least one service, wherein at least part of the memory means comprises service data in file structures within one directory, the directory comprising at least one file, the at least one file storing service data relating to one single service grouped together into:

application/service definition data comprising a unique service identifier and data indicating a service type;

at least two application counters for administrating the number of allocations and for generating a unique record transaction number;

a service sequence counter for generating a unique object number and administrating the number of created service objects;

a service float for administrating the number of either issued or received value units and data relating to access rights defining service actions allowed to be performed by predefined terminals, and wherein the memory means comprises at least a first key and a second key for protecting any data communication with an integrated circuit card.

The service definition data and the keys on the secure application module are used for the management of the service application, which was controlled by access tables on the integrated circuit card in the mechanisms according to the prior art. Thus, management control data is now stored on the secure application module instead of on the integrated circuit card. However, this is no serious disadvantage since the available memory space on the secure application module is less critical than on the integrated circuit card itself. Moreover, such a construction has several advantages.

First of all, the management of the applications may be realized more easily since the issuer of the integrated circuit cards is always able to establish a direct link between the secure application module and a central data collect system which is more difficult between the integrated circuit cards and the central data collect system.

Secondly, different service acceptants, i.e. parties which establish direct links between integrated circuit cards and the secure application module to facilitate a service, may be authorized to different access rights. The secure application module can easily check which service actions are allowed to a service acceptant to be carried out on an integrated circuit card, e.g. adding loyalty points, subtracting loyalty points, or only displaying a total number of loyalty points present on the integrated circuit card.

By using records within the file structure of the service slot mechanism, the use of access tables on the integrated circuit cards is avoided. The secure application module will always only allow use of a specified record number that has been read in a secured way.

The present invention also relates to a system comprising a secure application module according to the invention and at least one terminal coupled to the secure application module, the terminal being equipped to communicate with the secure application module and with at least one integrated circuit according to the invention in order to control a service carried out on the at least one integrated circuit card.

Moreover, the present invention relates to a method for controlling a service action to be carried out by a terminal on an integrated circuit card, the terminal being coupled to both a secure application module and to the integrated circuit card, including the following steps:

a. establishing whether the terminal is allowed to carry out the circuit action on the integrated service card by using at least one code and at least one secret key, both the at least one code and the at least one key being stored on both the integrated circuit card and the secure application module and by checking predetermined access rights, and b. carrying out the circuit action on the integrated service card;

c. checking step b. on the terminal, wherein the checking of predetermined access rights in step a is carried out on the secure application module using the data relating to access rights stored on the secure application module and the at least one code.

Thus, in the method according to the invention more steps of the application mechanism are carried out on the secure application module than in methods according to the prior art. This saves memory space on the integrated circuit cards and simplifies management of multiple applications on integrated circuit cards.

Since the available memory space in secure application modules is less critical than on integrated circuit cards the number of possible access rights may be rather large. Access rights may be defined in more ways than only read or write. In accordance with the invention access rights may relate to creating, erasing, increasing, decreasing, validating, marking, and verifying service slots on the integrated circuit card and to modifying additional data parts if present. These are only examples: other types of access rights may be implemented on the secure application module.

In an alternative embodiment, the method defined above includes the following step prior to the step of checking predetermined access rights in step a: reading out service data from the service slot and storing in the secure application module a predetermined data part of the data which has to remain unchanged; and by the step of carrying out step b. without changing the predetermined part of the data on the integrated circuit card.

BRIEF DESCRIPTION OF THE DRAWINGS

The present invention will be explained below with reference to some drawings. These drawings are only meant to illustrate the present invention and not to limit its scope.

FIGS. 2.1–2.3 show a schematic flow diagram of method steps carried out in an integrated circuit card, a terminal, and a secure application module, respectively, to support such a service in accordance with the prior art;

FIG. 3 shows a structure for several secure application module facilities;

FIGS. 8A.1 and 8A.2 show a schematic flow diagram of method steps carried out on an integrated circuit card, a terminal and a secure application module, respectively, for carrying out one of the following service actions: creating, erasing, or modifying a service object;

FIGS. 8B.1 and 8B.2 show an alternative flow diagram including steps for carrying out one of the following service actions: increasing, decreasing, validating, and marking an existing service object;

DETAILED DESCRIPTION OF THE EMBODIMENTS

Figure 1:
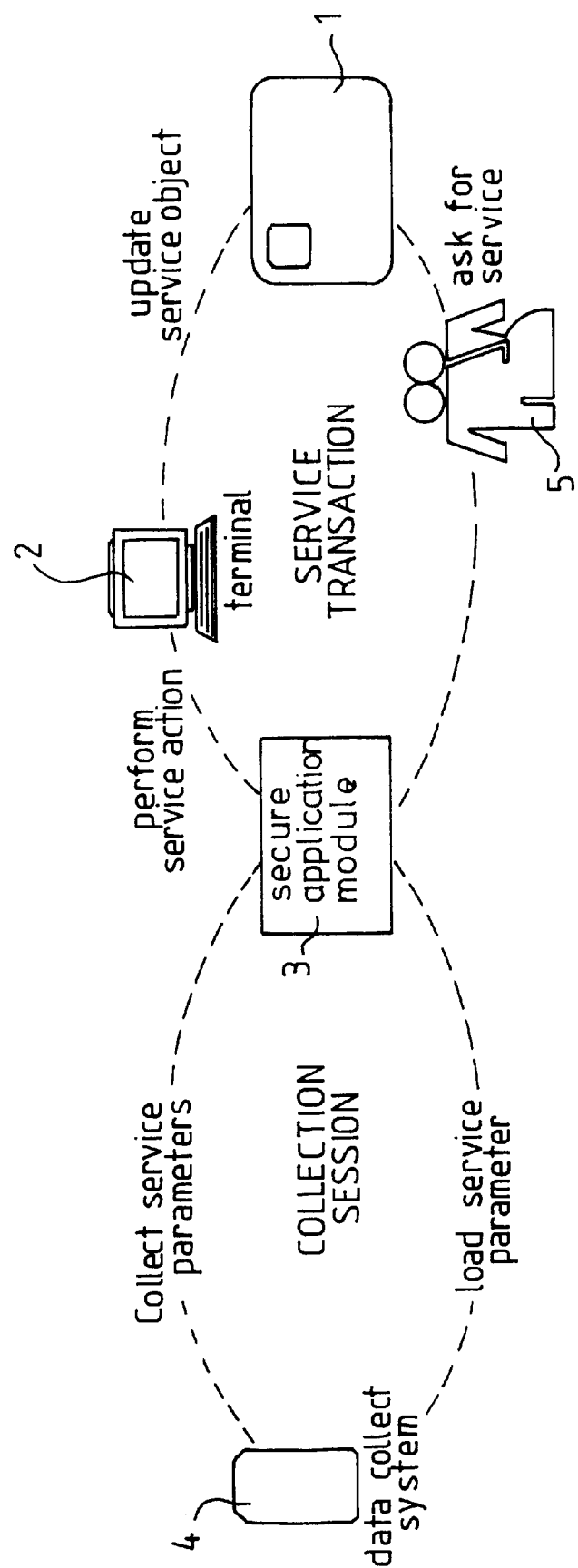
FIG. 1 shows processes to support integrated circuit card services like an "electronic purse" facility.

As shown in FIG. 1, in accordance with the state of the art, an integrated circuit card 1 may be loaded with one or more services, like an "electronic purse" facility. A user 5 may insert the integrated circuit card 1 into suitable connection means (not shown) of a terminal 2. The terminal 2 is coupled to a secure application module 3. A data collect system 4 is coupled to the secure application module 3 via the terminal interface. The connections between the terminal 2, the secure application module 3, the data collect system 4, and the integrated circuit card 1, respectively, may be either by conventional wires, optical fibres or by any wireless transmission technique.

The terminal 2 operates as an interface between the integrated circuit card 1 and the secure application module 3.

In order to facilitate the description, several definitions used will be stated firstly.

Service type: the type of card-related service to be used by a card holder 5. Examples of service types are the electronic purse, loyalty counters, loyalty coupons, identifiers, subscriptions, tickets, e.g. to be used for parking, public transport, cinema, concerts, etc.

Service application: the set of necessary service objects to be stored on the integrated circuit card 1 and on the secure application module 3, to be used for the exploitation of the service. Examples of service objects are: loyalty points, tickets, subscriptions, etc.

Service parameter: a service object that is necessary for the secure application module 3 in order to facilitate a service application, e.g., the application identifier, service identifier, service access rights, etc.

Service action: the (authorized) execution of one or more software routines which results in the modification, creation or elimination of the service object, for example, the creation or verification of a ticket or the increase or decrease of loyalty points on a loyalty coupon.

Service access rights: a defined authorization rule for the use of a certain service action by a predetermined terminal; some terminals may, for example, only have the right to read the number of loyalty points on a integrated circuit card 1, whereas others may have the authorization to modify this number of loyalty points.

Service object: the service related data structure that is securely stored on the integrated circuit card and which can be modified by a service (object) action (e.g. tickets, coupons, loyalty counters).

Hardware provider: the party which provides the integrated circuit card 1 to the card issuers and the secure application module 3 to the card acceptants. These integrated circuit cards 1 and secure application modules 3 will be provided with basic applications for the use of, for instance, the electronic purse. Part of the memory of the provided integrated circuit cards 1 and the secure application modules can be used for the storage of further applications to be determined by the card issuer/card acceptant.

Card issuer: the party which issues the integrated circuit card 1 to customers. This party determines the optional applications on the integrated circuit cards 1, usually after a legal agreement with the hardware provider.

Card acceptant: the party which buys the necessary secure application modules 3 from the hardware provider in order to offer several card-related services to the card holders 5. These secure application modules 3 must be linked to the terminal(s) 2 of the card acceptant. The card acceptant determines the optional applications on the secure application module 3, usually after a legal agreement with the hardware provider.

Application provider: the party which facilitates these card-related services, by means of storing service application modules on the integrated circuit card 1 and on the secure application modules 3. This party must also provide the necessary terminal software to be stored in the terminal (s) 2 of the card acceptant.

Service provider: the party which (financially) exploits the card-related service offered by a card acceptant and facilitated by an application provider.

Service acceptant: the party which establishes the direct link between the card holder 5 and a certain service via an on-line service host or via an off-line service terminal 2. This party performs the service actions on the stored service object, for which it is allowed to use.

Card holder 5: the customer who uses the integrated circuit card 1 for several services by means of establishing the necessary link between the integrated circuit card 1 and the terminal 2, e.g., by inserting the Chipper in a retailer's reader or by communicating via a Tele-Chipper®.

As shown in FIG. 1, the terminal 2 controls any service transaction after a customer 5 has connected his integrated circuit card 1 to the terminal 2. The terminal 2 performs any service action to be made and updates the service object on the integrated circuit card 1. At the same time, the terminal 2 performs the necessary actions on the secure application module 3.

The data collect system 4 collects service parameters from and loads service parameters on the secure application module 3 in a collection session.

The collection session as indicated in FIG. 1 is known to persons skilled in the art and is not explained in detail here.

As indicated above, several multiple application authorization mechanisms have been described before, like in U.S. Pat. No 5,473,690, WO-A-92/06451, EP-A-0,640,945, EP-A-0,644,513, WO-A-87/07060, and EP-A-0,262,025 and EP-A-0,661,675. These known multiple application authorization mechanisms share a direct memory access structure, i.e., without directories and files structures. A secret code C is used for accessing the application with an identifier I on the integrated circuit card 1. Whenever a secure application module 3 wishes to access this application it must be able to generate this secret code C. This secret code C may be encrypted when it is supplied to the integrated circuit card 1 to avoid its disclosure to the outside world. Alternatively, this code C may be processed with a message authentication code (MAC) in order to avoid any modification by the outside world. As a further alternative, this code C may be supplied directly. A control mechanism on the integrated circuit card 1 may count how many times a wrong code C is supplied.

A second feature of all these known mechanisms is the presence of an access table on the integrated circuit card 1. Mostly, such a table comprises a plurality of entries consisting of 1) the secret code C for a specific application, 2) related memory locations M on the integrated circuit card 1 used by that application (e.g. referring to zones, number of bytes, offsets, records, etc.) and 3) related access rights A applicable to this application (e.g. read/write rights, PIN, etc.). When either option 1 or option 2 is used a secret key Ks is required.

FIG. 2 shows a schematic flow diagram broadly summarizing the mechanism according to the prior art when writing data D on a memory location M of the application related to the code C. Four phases can be distinguished: the initialization phase in which several parameters are stored in the integrated circuit card (ICC) 1 and the secure application module (SAM) 3, the application access phase in which the integrated circuit card 1 checks whether the secret code C as supplied is correct, the application request phase in which the request to write data D on the memory location M is made, and the request authorization execution phase in which the terminal is authorized to write data on memory location M given access rights A and code C. The use of random numbers RND is optional but is required to avoid so-called "replay attacks". A random number RND is used by the secure application module 3 to encrypt the code C when the secret code C is to be transferred from the secure application module 3 to the integrated circuit card 1. The integrated circuit card 1 is equipped to decode the encoded secret code C. Thus, the terminal 2 when transferring the encrypted secret code C from the secure application module 3 to the integrated circuit card 1 does not know the value of the secret code C and will not be able to carry out any further action on the integrated circuit card 1 without being authorized.

The flow diagram of FIG. 2 is separated into three parts relating to the integrated circuit card (ICC) 1, the terminal 2, and the secure application module (SAM) 3, respectively.

In step 201, the integrated circuit card 1 stores the following set of parameters for an application: an identifier I, a secret code C, a memory location M, and access rights A.

In step 202, the integrated circuit card 1 stores a secret key Ks.

In the initialization phase, in step 203, the secure application module 3 stores an application identifier I' and a secret code C'. In step 204, the secure application module stores the secret key Ks.

For the same application, it is required that I=I' and C=C'.

In the application access phase the following steps are carried out.

In step 205 the integrated circuit card 1 generates a random number RND which is stored in step 206.

In step 207, the random number RND is transmitted to the terminal 2.

Step 208 indicates that the terminal 2 is waiting for receipt of the random number RND. As long as the random number RND has not been received the terminal 2 remains waiting.

As soon as the terminal 2 has received the random number RND it transfers the random number RND, in step 209, to the secure application module 3.

Step 210 indicates that in the application access phase the secure application module 3 waits until the random number RND has been received.

As soon as the random number RND has been received the secure application module 3 computes the value of a parameter Y in accordance with:

$$Y:=Enc(RND,C')Ks$$

Thus, the parameter Y is an encrypted form of the secret code C', the value of Y being determined by the value of the random number RND as received in step 210 and by the secret key Ks.

In step 212, the secure application module 3 transmits the application identifier I' and the parameter Y to the terminal 2.

Step 213 indicates that the terminal 2 is waiting for receipt of the application identifier I' and the parameter Y.

As soon as the terminal 2 receives the application identifier I' and the parameter Y, it transfers the application identifier I' and the parameter Y to the integrated circuit card 1.

Step 215 indicates that the integrated circuit card 1 is waiting until it has received the application identifier I' and the parameter Y.

As soon as the application identifier I' and the parameter Y have been received the integrated circuit card 1 searches the entry on the application identifier I', as indicated in step 216.

Then, the integrated circuit card 1 computes the value of a parameter X in accordance with:

$$X:=Dec(RND,C)Ks$$

When de secret code C is equal to the secret code C', then, the value of parameter X needs to be equal to the value of the parameter Y. This equivalence is checked in step 218 where a Boolean parameter R is computed in accordance with a Boolean operation X=Y?

In step 219 the Boolean value of parameter R is transmitted to the terminal 2.

The terminal 2 is waiting in step 220 for receipt of the parameter R. As soon as parameter R has been received, in step 221, the terminal 2 checks whether R=true. If not, the terminal 2 will generate an error message in step 222 which may be shown to the user through suitable display means (not shown).

If R=true, the application request phase may start.

In the application request phase the terminal 2 requests, in step 223, the integrated circuit card 1 to generate a random number RND.

Step 224 indicates that the integrated circuit card 1 is waiting for such a request.

After receipt of said request, in step 225, the integrated circuit card 1 generates a random number RND, which is stored in step 226.

Then, the integrated circuit card 1 transmits the random number RND in step 227 to the terminal 2.

Step 228 indicates that the terminal 2 is waiting until the random number RND is received.

If so, in step 229, the random number RND is transferred to the secure application module 3.

Step 230 indicates that the secure application module 3 is waiting until the random number RND has been received.

After the terminal 2 has transferred the random number RND in step 229 the terminal 2, in step 231, starts the write operation by sending a write request to the secure application module 3.

Step 232 indicates that the secure application module 3 is waiting until such a write request has been received. If so, it computes, in step 233, the value of parameter Y in accordance with:

$$Y:=MAC(RND,D,M)Ks$$

Thus, Y is obtained by a message authentication code (MAC) operation on the values of the random number RND, the data D and the memory location M by using secret key Ks.

In step 234, the secure application module 3 transmits Y to the terminal 2.

Step 235 indicates that the terminal 2 is waiting until Y has been received.

If so, the application authorization execution may start.

In the application authorization execution phase the terminal 2 starts with a request to write data D on memory location M in the integrated circuit card 1 given the computed value of Y. This is indicated by reference number 236.

In step 237 the integrated circuit card 1 waits until such a write request has been received.

If so, the integrated circuit card 1 computes the value of parameter X in accordance with:

$$X:=MAC(RND,D,M)Ks.$$

Thus, if the value of key Ks has been properly stored both on the integrated circuit card 1 and the secure application module 3, X will be equal to Y. This is checked in step 239, where the integrated circuit card 1 computes the value of Boolean parameter R in accordance with X=Y?

In step 240, the integrated circuit card 1 establishes whether the terminal 2 is authorized to write the data D on memory location M, given the values of the access rights A and the secret code C. If not, in step 241, the integrated circuit card 1 may generate an error message which may be sent to the terminal 2 for display on display means (not shown).

If the terminal 2 is authorized to write, then, the integrated circuit card 1 will write the data D on memory location M, as indicated in step 242.

In step 243, the integrated circuit card 1 transmits the value of Boolean parameter R to the terminal 2.

Step 244 indicates that the terminal 2 is waiting until the Boolean parameter R has been received.

If so, the terminal 2 evaluates the Boolean parameter R in step 245 to check whether the write operation has been executed correctly.

Steps 246, 247 and 248 indicate the end of the processing on the integrated circuit card 1, the terminal 2 and the secure application module 3, respectively.

Although FIG. 2 relates to a write operation it may be clear to a person skilled in the art that this is an example only. Read operations and other operations may be processed in the same way, in accordance with the prior art.

Thus, from FIG. 2 it may be clear, that, in accordance with the prior art, in multiple application authorization mechanisms, the integrated circuit card 1 comprises a table for any individual application. Any of these tables comprises an application identifier I, a secret code C, an indication of the memory zones M where the application has been stored, and a definition of access rights A optionally linked to more than one service acceptant.

Contrary to this known mechanism, the multiple application authorization mechanism according to the present invention is based on a directory and file structure in the memory of the integrated circuit card 1. Moreover, in accordance with the present invention no access right tables are stored on the integrated circuit card 1 itself but are stored in the secure application module, thus, saving memory space in the integrated circuit card 1.

In practice, on one physical secure application module 3 both an electronic purse application and one or more other services must be implemented. These services must be clearly separated from one another.

In accordance with the invention, a "service slot mechanism" is used to facilitate the service applications other than the already existing electronic purse application. This will be explained below.

FIG. 3 schematically indicates that within the secure application module 3 a service slot mechanism 7 must co-exist with an existing electronic purse mechanism 8. Both the service slot mechanism 7 and the electronic purse mechanism 8 are implemented by means of generic secure application module facilities, such as internal files and an internal finite state machine.

Below, an example of using service slots will be given. In this example the previously stated definitions will be used which are, thus, further clarified.

It is assumed that a "generic service slot" (which will be explained with reference to FIG. 4) is used in the example. If one of the definitions given above is used, it is printed in italics.

A local shopping centre (service provider) decides to begin a regional loyalty scheme for the frequent visitors (card holders) of the centre. The wish of the centre is that all retailers (service acceptants) which are participating in the loyalty scheme must be able to safely store points (service 1) on the integrated circuit card 1. Most of the retailers are already accepting the integrated circuit card 1 for the payment of small amounts, i.e., the integrated circuit card 1 already serves an electronic purse application. The idea is that if the customer (card holder) has collected 100 of these issued points he can exchange them for a loyalty coupon (service 2) at a specific loyalty terminal 2 on a specific location in the centre. Then this coupon can only be exchanged for a specific product at the shop of a specific retailer.

The shopping centre agrees with the hardware provider and the card issuer concerned that two "generic service slots" are used for the implementation of the loyalty scheme (service application). In order to use the integrated circuit card 1 for the loyalty scheme, the hardware provider, which in this case is also the application provider, must provide the secure application modules 3 of the participating retailers with the necessary service parameters. These necessary service parameters will be loaded into the secure application module 3 during a collection session (see FIG. 1) which is already facilitated by the hardware provider. Therefore, the hardware provider must have the secure application module identifiers at its disposal. By means of these service parameters the retailers are able to perform some service actions.

At the normal payment terminals 2, the retailer must be able to increase a loyalty counter on the integrated circuit card 1 and to accept loyalty coupons that are stored on the integrated circuit card 1. However, the retailer must not be able to decrease the counter or to create loyalty coupons. In other words, the service access rights for any retailer concerned, i.e. any terminal 2 concerned, must be well defined. When increasing the loyalty counter or accepting a loyalty coupon the retailer stores a "stamp" on the integrated circuit card 1 in order to depict the location of the last loyalty transaction.

When creating loyalty points, a loyalty counter in the secure application module 3 of the terminal 2 concerned will be increased by the issued amount of points. This is also done for the creation of loyalty coupons at the loyalty terminal. The value of these counters will also be collected by the hardware provider during a collection session (see FIG. 1) and will then be distributed to a central system of the centre. In order to be able to administrate the saved points per card holder, the loyalty system must use loyalty transaction records that are processed by a central system which may be implemented as a personal computer. Then, if a customer 5 loses or damages his integrated circuit card 1 the shopping centre will be able to restore the collected amount of points on a new integrated circuit card 1.

In order to limit the number of points to be issued, each payment terminal must be able to issue, e.g., 10,000 loyalty points. Also, the retailer must pay a predetermined amount of money to a central shopping centre's account for each point to be issued. Therefore, the secure application module 3 of the terminal 2 concerned must be reloaded with 10,000 points, each time that all the points have been issued (e.g. once a week). The reloading of the secure application module 3 will be handled during the collection session (see FIG. 1).

After having arranged all this, the retailers are able to accept the integrated circuit card 1 for their loyalty scheme. In order to enable the customer 5 to participate in the loyalty scheme, the retailer must allocate two "generic service slots" on the integrated circuit card 1. One of these "generic service slots" is used for the storage of points and another for the storage of coupons. If the customer 5 has two service slots available he can authorize the allocation by means of entering his PIN. Only for the allocation of the slot the customer's PIN is required but not for the storage of points or coupons. When a retailer has allocated two slots on the integrated circuit card 1 an allocation counter in the secure application module 3 is increased by two. Based on this allocation counter the hardware provider charges the shopping centre with a certain amount of money. During a collection session (see FIG. 1), this allocation counter is read in a secure way.

In accordance with the invention, the integrated circuit card service types (e.g. a loyalty points service), or groups of service types, will be stored in one service domain, protected by a unique key (one service domain is equal to one set of files, profile, data, and additional data), i.e. one common directory on the integrated circuit card 1. This directory contains several "generic service slots". Any of these "generic service slots" comprises the data for one service application. "Generic service slots" will be used for services of the same type (or the same group of types), originating from different application providers.

Figure 4:
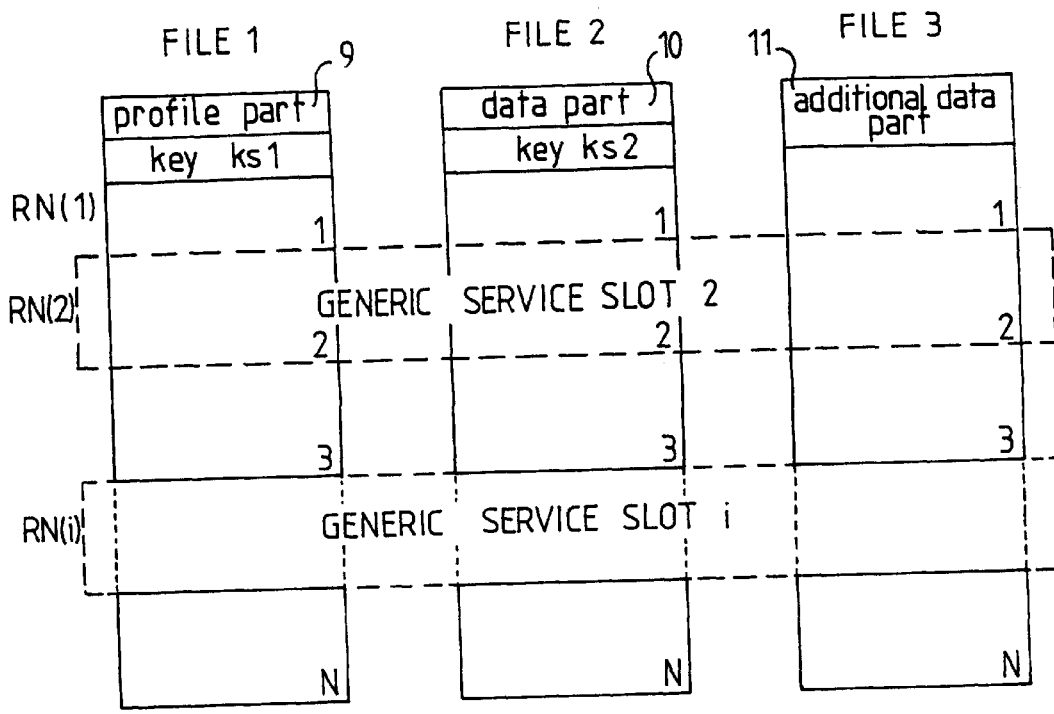
FIG. 4 shows a service application environment on an integrated circuit card which may be used for services of the same type, originating from different application providers (generic service slots)

Each service domain will be protected by a unique set of cryptographic keys Ks1, Ks2, see FIG. 4. Thus, any of the generic service slots belonging to the application environment will be protected by the same two keys Ks1 and Ks2. In order to prohibit the reading and writing of these generic service slots by unauthorized parties and to necessitate a PIN when initializing a generic service slot, the generic service slot must be subdivided into a profile part and a data part. This is indicated in FIG. 4. The profile part will function as an authorization mechanism for each of the generic service slots. This mechanism must always be used in addition to the cryptographic security architecture of the application environment (directory) concerned.

As shown in FIG. 4, the profile parts of the generic service slots present are grouped together within a first file. Moreover, the data parts of the generic service slots present are grouped into a second separate file.

Any of the generic service slots may comprise an additional data part for storing additional data. The additional data parts of the generic service slots are grouped together into a third separate file.

Any generic service slot i within the application environment (directory) can easily be found by using a record number RN(i). For any i, the profile part, data part and additional data part concerned are stored in the same record RN(i) of the three different files.

The profile part may, for instance, comprise 20 bytes. For any application, the profile part concerned contains a unique application identifier and a slot label. In a preferred embodiment, the profile part of a generic service slot comprises data as to an expiry date. This expiry date refers to a date when the service concerned expires for the integrated circuit card 1 concerned. From that day onwards the generic service slot concerned is available to be used for any other service application, i.e., the data in the generic service slot concerned may be deleted and the generic service slot concerned may be written by another service automatically.

The data part of the generic service slot contains data which depends on the service type for which the generic service slot is used. For example, the data for a loyalty scheme will be different from the data for a subscription.

The additional data part depends on the service type. It offers the possibility of storing additional data when required. For some applications no additional data part is required.

A detailed description of the structure of a generic service slot will be given later, with reference to FIG. 9.

Figure 5:
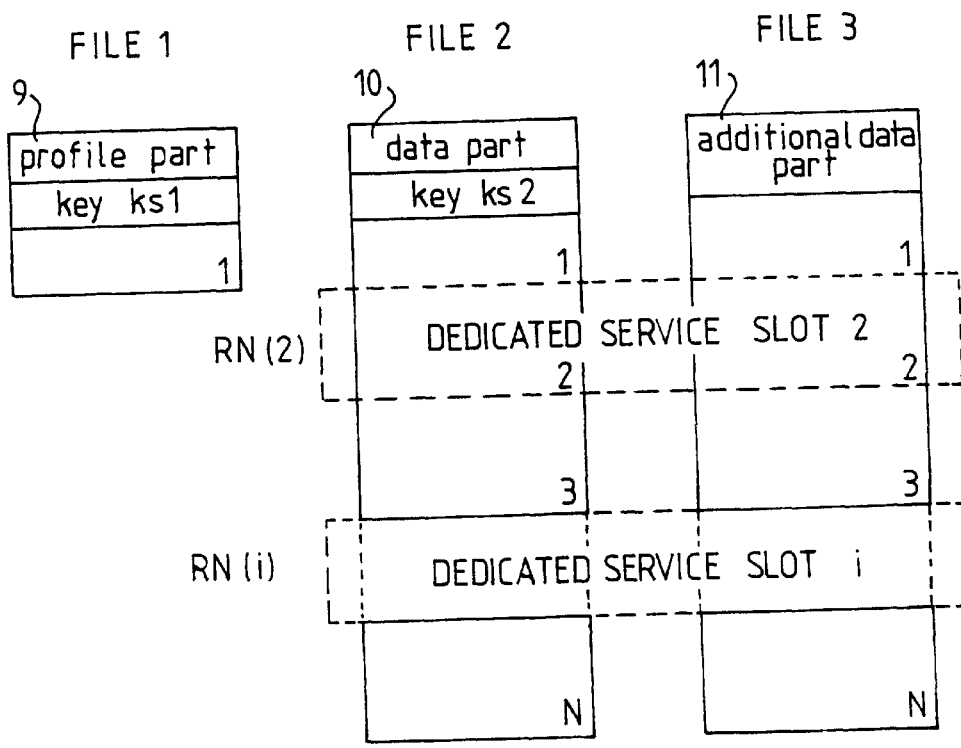
FIG. 5 shows a structure of an alternative service application environment for services of different types, originating from one application provider only (dedicated service slots)

FIG. 5 shows an alternative structure for an application environment on an integrated circuit card 1. This alternative structure is applicable if one single application provider wishes to facilitate different service types, e.g. loyalty points, tickets, subscriptions, etc. In such a case several different generic service slots, as explained with reference to FIG. 4, may be used. However, this would result in 1) performance loss due to the required application switching time and 2) memory loss due to the presence of identical profile parts. Therefore, it must also be possible for an application provider to use different service types within one application environment.

The required service objects for these different service types will, then, be stored into "dedicated service slots", as referred to in FIG. 5. These dedicated service slots will only be used for services of different types, originating from one single application provider.

For the use of such dedicated service slots only one profile part will be necessary because all data parts are used by the same application provider. However, due to the fact that the contents of the dedicated profile part are directly linked to one key environment (of the application provider), the single profile part does not have to be checked by the secure application module 3 concerned.

Thus, in the embodiment according to FIG. 5, still three different files (or two files when the file with additional data parts is superfluous) are used. However, the file for the profile parts only comprises one single profile part and, therefore, needs less memory locations than in the embodiment according to FIG. 4.

An example of the embodiment according to FIG. 5 is the situation in which one single public transport firm offers several different services and in which one or more railway firms and one or more bus companies are operating as service acceptants. Then, the different services may relate to storing railway tickets, bus tickets, loyalty points etc.

Figure 6:
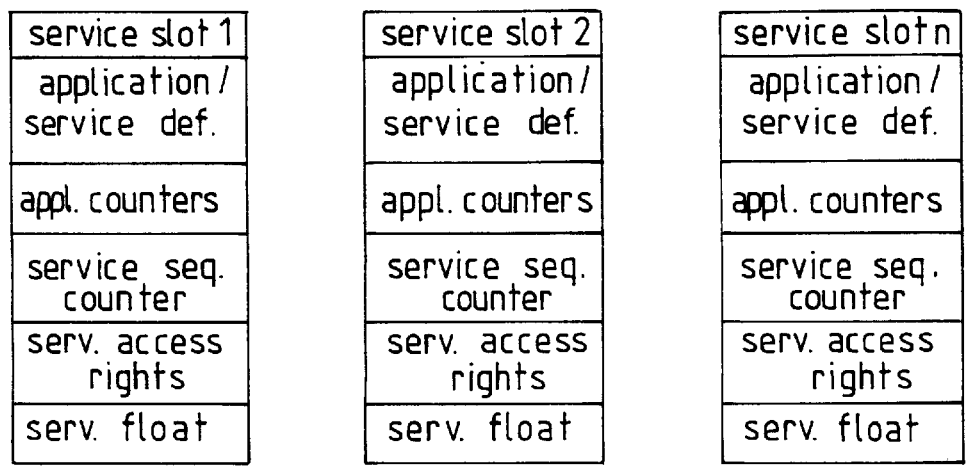
FIG. 6 shows a structure of a service application environment of a secure application module in accordance with the present invention.

While the card service slots (FIGS. 4 and 5) are grouped per service type the secure application module service slots are grouped per application provider and stored into one single secure application module application environment, i.e., one single directory on the secure application module. For example, a retailer could provide loyalty points, loyalty coupons and loyalty cross-selling points whereas another organization could provide electronic tickets and electronic subscriptions on the same integrated circuit card 1. The secure application module of this retailer needs only to control these loyalty points, loyalty coupons and loyalty cross-selling points. The secure application module of the other organization need only to control the electronic tickets and the electronic subscriptions. Thus, the application environment on the secure application module concerned can be organized into different service slots, as shown in FIG. 6. A secure application module service slot consists of an application service definition, two application counters, a service float, a service sequence counter, and service access rights of the terminal concerned. The application service definition will be used to store the unique service identifier and to determine the service type. The application counters are an allocation counter for administrating the number of allocations, and a transaction counter for generating a unique record transaction number. The service float administrates the number of issued/received value units, if applicable. The service sequence counter generates a unique object number and administrates the number of created service objects.

The service rights must define the service actions which the secure application module concerned is allowed to perform. For example, a secure application module could be authorized for issuing loyalty points, i.e. increasing the loyalty counter on an integrated circuit card 1 but not for receiving loyalty points, i.e. decreasing the loyalty counter. The service rights will also contain the necessary parameters for the use of internal secure application module variables.

In order to assign a certain service to a secure application module service slot, the service parameters must be loaded in the available service slot. The loading of these parameters will be protected by some cryptographic means, i.e. the cryptographic key Ksam as denoted in FIGS. 2 and 8.

Multiple secure application modules may be provided by a hardware provider to each requesting card acceptant which has a contract or agreement with the hardware provider. Normally, each secure application module will at least be provided with the electronic purse service and with one or more other services facilitated by one or more other application providers. The card acceptant's choice on which services to offer by his terminal can be determined during personalization of the secure application module but can also be determined when the secure application module has already been installed at the card acceptant's location.

Figure 7:
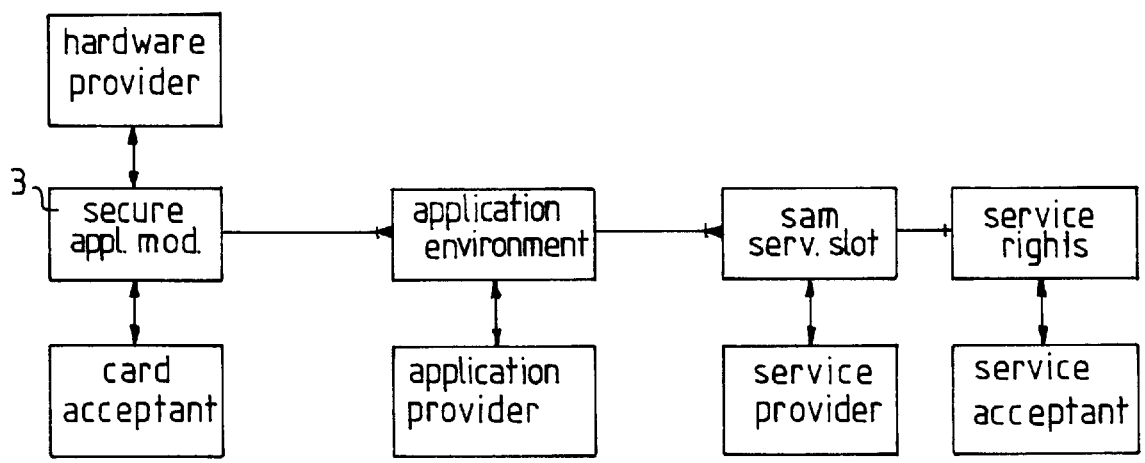
FIG. 7 shows a secure application module and its relation between several parties involved for providing and facilitating a service.

As schematically shown in FIG. 7, the secure application module 3 must facilitate a layered application and security structure. The secure application module 3 will be provided by the hardware provider and will be used by the authorized card acceptant.

The following conditions must be met:
each secure application module 3 must be able to facilitate applications provided by one or more application providers, e.g. the provider of an electronic purse application;
each application must be able to facilitate services of one or more service providers which are sharing one service application environment of a secure application module 3;
each service will be used by one or more service acceptants which are authorized by means of the service rights defined.

Processing service slots

In order to use the card service slots, both the service slots and the SAM service slot application must be processed by the terminal. Now a description is given of the possible service actions on slot profile and the data part of the service slots. The service actions will be divided into profile actions, which can be performed on the slot profile, and object actions which can be performed on the data part.

The next profile actions have been defined:
allocate service slot (only applicable for generic service slots);
release service slot (only applicable for generic service slots);
block service slot (applicable for both types);
unblock service slot (applicable for both types);
modify profile (applicable for both types).

The first two profile actions will only be performed on generic service slots, while the last three actions can be performed on both dedicated service slots and generic service slots. If applying the last three actions on a dedicated application, the use of a PIN can be omitted.

Allocating a service slot

If the SAM service slot application has been initialized already, the terminal (i.e. the SAM) should be able to allocate a generic service slot on the integrated circuit card. Therefore, a free service slot must be available and the cardholder must have entered his/her PIN correctly. Depending on application access rights, the terminal will be able to allocate a generic service slot. The next steps need to be performed:

1. checking the application access rights;
2. checking of the service slot is empty;
3. retrieving (the record number of) the free service slot on the card;
4. checking the PIN of the cardholder;
5. determining the expiry date of the generic service slot;
6. updating the allocation counter in the SAM;
7. initializing the slot profile (using the application identifier that is stored in the SAM).

Releasing a service slot

Next to allocating a generic service slot, it must also be possible to release a generic service slot. This will be handled by a similar mechanism as for the allocation of a card service slot. However, instead of loading authorization parameters, the service slot will be loaded with a certain fixed zero pattern (indicating that the slot is free to use). Only the application provider of the allocated slot can release its slot. But there must also be an option that an expired slot can be allocated by an arbitrary application provider. This could be possible, if a collection-date has been securely loaded into the SAM. The next steps need to be performed:

1. checking the application access rights;
2. determining the generic service slot to be released;
3. retrieving (the record number of) the (expired) service slot on the card;
4. checking the PIN of the cardholder;
5. initializing the slot profile (using a fixed zero-pattern).

Blocking a service slot

By means if the status byte that is stored into the slot profile, there is an option to block a generic service slot. This option could be used when performing on-line sessions in order to maintain the integrity of the application (e.g. similar to the use of the reload flag of the card electronic purse application).

If a generic service slot has been blocked it cannot be used again, unless the service slot will be unblocked again. The next steps need to be performed:

1. checking the application access rights;
2. determining the generic service slot to be blocked;
3. retrieving (the record number of) the service slot on the card;
4. checking the PIN of the cardholder;
5. modifying the first byte of the slot profile (using a fixed block-pattern).

Unblocking a service slot

By means of this profile action, the status byte of the slot profile will be reset to zero. The authorization for performing this action depends on the application access rights as stored in the SAM.

If a generic service slot has been unblocked it can be used again. The next steps need to be performed:

1. checking the application access rights;
2. determining the generic service slot to be unblocked;
3. retrieving (the record number of) the service slot on the card;
4. checking the PIN of the cardholder;
5. modifying the first byte of the slot profile (using a fixed unblock-pattern).

Modifying a slot profile

By means of this profile action, the service provider can modify the non-critical data of the slot profile (e.g. the last 11 bytes). These bytes could then be used to store additional data like a customer profile, a label, or other information. The next steps need to be performed:

1. checking the application access rights;
2. determining the generic service slot to be modified;

3. retrieving (the record number of) the service slot on the card;
4. checking the PIN of the cardholder;
5. modifying the non-critical data of the slot profile, e.g. the last 11 bytes of the slot profile (using arbitrary data).

The data part of a generic/dedicated service slot can be processed by several object actions, depending on the concerning service (e.g. loyalty points, tickets, etc.). However, the secure application module must always authorize the requested service actions, by means of the defined service access rights. The next service actions have been defined:

create service slot;

erase service slot;

increase service slot;

decrease service slot;

validate service slot;

mark service slot;

verify service slot;

modify additional data part.

It is observed that when creating or erasing a service slot, step 3 defined above ("retrieving the free service slot") in the paragraph related to the allocation of a service slot, may, optionally, be omitted.

Below, with reference to FIGS. 8a and 8b, examples of service actions on a service slot on an integrated circuit card 1 will be described. FIG. 8a is applicable to the following service actions: creating, erasing, or modifying a service object, whereas FIG. 8b is applicable to one of the following service actions: increasing, decreasing, validating or marking an existing service object.

FIGS. 8a and 8b have been presented as flow diagrams showing actions to be performed by the integrated circuit card 1, the terminal 2, and the secure application module 3, respectively. Both the flow diagrams of FIGS. 8a and 8b have been divided in four phases: initialization, application request and authorization, service action request and authorization, and service action execution, respectively.

In the initialization phase the integrated circuit card 1 loads two keys Ks1, Ks2. The same keys Ks1, Ks2 are loaded by the secure application module 3, which also loads a further key Ksam. This is shown in line 801.

The integrated circuit card 1 also writes an application code C' and a service code S' in its memory by using key Ks2, i.e., it allocates a slot, line 802. The secure application module 3 writes, as is also shown in line 802, an application code C and a service code S as well as application/service access conditions A in its memory using Ksam. After that, the initialization phase is completed The application request and authorization phase starts with a request by terminal 2 to the integrated circuit card 1, which has been brought into communicating contact with the terminal 2, to select a file profile. The integrated circuit card 1 gets the request to select a file profile in line 803.

Line 804 indicates that the integrated circuit card 1 then continues to select the correct file.

The next step is that terminal 2 requests the integrated circuit card 1 to seek application code C' and the service code S'. In line 805 it is indicated that the integrated circuit card 1 gets that request, whereas, in line 806, it is indicated that it searches for the application code C' and the service code S'.

In line 807 it is indicated that the integrated circuit card 1 replies by returning the record number RN' related to the application code C' and the service code S'. This record number RN' is received by the terminal 2 in line 807, and the validity of record number RN' is checked in line 808.

If the validity of the record number RN' is correct, then, in line 809, the terminal 2 asks the secure application module 3 to generate a random number RND1. After the secure application module 3 has got the request (line 809), it generates such a random number RND1, line 810, and stores it in its memory, line 811.

In line 812, the secure application module 3 returns the generated random number RND1 to the terminal 2, which gives it to the integrated circuit card 1.

The next step, as indicated in line 813, is that the terminal 2 requests the integrated circuit card 1 to read the content of record number RN'. As is also indicated in line 813, the request is received by the integrated circuit card 1.

Then, in line 814, the integrated circuit card 1 computes the value of a parameter Y:

$$Y:=MAC(RND1,RN',C')Ks1$$

Thus, the value of Y is computed by processing the random number RND1, the record number RN', and the application code C' with a message authentication code (MAC) using key Ks1.

In line 815, the integrated circuit card 1 transmits the application code C' and the parameter Y to the terminal 2 which receives them, as is also indicated in line 815.

In line 816, the terminal 2 transmits a request to the secure application module 3 to verify the value of Y by transmitting the application code C', the record number RN' and the parameter Y to the secure application module 3.

After the secure application module 3 has received these parameters (line 816), it stores the application code C' and the record number RN' in line 817.

In line 818 the secure application module 3 computes the value of Boolean parameter R in accordance with:

$$R:=Bool(C'==C)$$

In line 819 the secure application module 3 checks whether R=true.

If so, in line 820, the secure application module 3 computes the value of a parameter X:

$$X:=MAC(RND1,RN',C')Ks1$$

Thus, the value of X is computed by processing the random number RND1, the record number RN', and the application code C' with a message authentication code MAC using key Ks1. Therefore, parameter X is computed similar to the parameter Y. If the keys Ks1 are equal, X must be equal to Y. This is checked in lines 821 and 822, where, first of all, Boolean parameter R is calculated in accordance with: R=Bool (X==Y), and, then, it is checked whether R=true.

In line 823, the value of Boolean parameter R is transmitted to the terminal 2, which checks its value upon receipt.

If the Boolean parameter R=true, the next phase, i.e. service action request and authorization phase, can be started.

In line 824, the terminal 2 requests the integrated circuit card 1 to select a file service. That request is received by the integrated circuit card 1, still in line 824.

Upon the receipt of the request, in line 825, the integrated circuit card 1 selects the correct file.

Then, in line 826, the terminal 2 asks the integrated circuit card 1 to generate a random number RND2.

The request is received in line 826 by the integrated circuit card 1. Upon the receipt of the request the integrated circuit card 1 generates a random number RND2, line 827, and stores it in line 828.

In line 829, the generated random number RND2 is transmitted to the terminal 2 which gives it to the secure application module 3, as is also indicated in line 829.

Then, in line 830, the terminal 2 requests the secure application module 3 whether it is authorized to carry out a certain service action, e.g. a write action, on the integrated circuit card 1. The request is received by the secure application module 3 in line 830. The request received refers to a request to write service data D in record number RN given a service code S'.

Then, in line 831, the secure application module 3 computes the value of Boolean parameter R in accordance with:

$$R:=\text{Bool}(RN'==RN)$$

In line 832, the secure application module 3 checks whether R=true. If so, then it is evident, that the request relates to the correct record number RN.

In line 833, the secure application module 3 computes Boolean parameter R in accordance with:

$$R:=\text{Bool}(S'==S)$$

Then, in line 834, the secure application module 3 checks whether R=true. If so, then it is evident that the request relates to the correct service.

In line 835, the secure application module 3 computes Boolean parameter R in accordance with:

$$R:=\text{authorize }(WRITE,C,S,A)$$

Then, in line 836, the secure application module 3 checks whether R=true. If so, then, the terminal is authorized to carry out the service action on the given record number RN in the integrated circuit card 1, as requested.

In line 837, the secure application module 3 computes the value of parameter X in accordance with:

$$X:=MAC(RND2,S,D,RN)Ks2$$

Thus, the value of X is computed by processing the parameters (RND2, S, D, and RN) with a message authentication code (MAC) by using key Ks2.

In step 838, the parameter X is transmitted to terminal 2. The terminal 2 receives the parameter X in line 838 and checks its validity in line 839.

After the validity of the parameter X has been checked by the terminal 2, the service action execution phase can be started.

This last phase starts with a request by terminal 2 to write service data D in record number RN, given service code S and parameter X. The request is received by the integrated circuit card 1 in line 840.

After the receipt, the integrated circuit card 1 computes the value of parameter Y in accordance with:

$$Y:=MAC(RND2,S,D,RN)Ks2$$

Thus, the value of Y must be equal to the value of X if the keys Ks2 stored on both the integrated circuit card 1 and the secure application module 3 are equal.

This equivalence is checked in line 842 and 843. First of all, Boolean parameter R is computed in accordance with:

$$R:=\text{Bool}(X==Y)$$

Then, in line 843, the integrated circuit card 1 checks whether R=true.

If so, all checks made are positive and, in line 844, the integrated circuit card can fetch the record number RN.

In line 845, the integrated circuit card 1 stores the service data D, as well as the service code S on the record number RN, i.e., it carries out the requested write action.

In order to complete the service action, in line 846, the integrated circuit card 1 transmits the value of Boolean parameter R to the terminal 2.

After receipt of the Boolean parameter R (line 846), the terminal 2 checks the content of the Boolean parameter R, line 847, in order to be sure that the write request as transmitted in line 840 has been carried out properly.

Those steps which are essential in carrying out the service action illustrated in FIG. 8a, have been outlined by rectangular lines. The application of random numbers RND1 and RND2 is optional, similar as in the prior art. In practice, random numbers will always be used to avoid "replay attacks", as explained with reference to FIG. 2.

FIG. 8b shows a flow diagram which is an amended flow diagram of the one shown in FIG. 8a. The flow diagram of FIG. 8b illustrates steps for carrying out one of the following service actions: increasing, decreasing, validating, and marking an existing service object in an integrated circuit card 1.

Those steps in FIG. 8b which are equal to the steps in FIG. 8a have been indicated by equal line numbers. Their meaning will not be explained again. There are only some different steps in the service action request and authorization phase indicated by lines 825a–825p and amended lines 830a, 837a, 837b. They will be explained below.

The main difference between the service actions of FIG. 8a (i.e. creating, erasing, or modifying a service object) and of FIG. 8b (i.e. increasing, decreasing, validating, or marking an existing service object) is that in the first case the existing data content of the service slot on which the service action has to be carried out does not need to be verified, whereas this is necessary in the latter case. When carrying out the service actions according to FIG. 8b only a certain part of the data content of the service object is to be changed (this data part is called "D.var" in FIG. 8b whereas the remaining part of the data of the service object that is to remain identical is called "D.fixed" in FIG. 8b). In order to know the content of this remaining part of the data D.fixed, in lines 825a–825p, a secure read operating is carried out on integrated circuit card 1.

Again, in FIG. 8b, those steps which are essential to the service action are outlined in rectangular lines.

In line 825a in FIG. 8b, after the integrated circuit card 1 has selected the correct file during the service action request and authorization phase, terminal 2 requests the secure application module 3 to generate a random number RND3.

Also shown in line 825a is that secure application module 3 receives the request.

After that, the security application module 3 generates a random number RND3 (line 825b) and stores it in its memory (line 825c). Then, the random number RND3 is transmitted to the integrated circuit card 1 through terminal 2, as indicated in line 825d.

Then, in line 825e, the terminal 2 requests the integrated circuit card 1 to read the content of record number RN'.

After receipt of the request (line 825e), the integrated circuit card 1 computes the content of a parameter Y in accordance with:

$$Y:=MAC(RND3,M',S',D')Ks1$$

Thus, the content of parameter Y is computed by processing the parameters RND3, M', S', D' with a message authentication code (MAC) by using key Ks1. Here, S' refers to the service code concerned and D' refers to the content of record number RN' which has been read.

In line 825g, the integrated circuit card 1 transmits the service code S', data D', and parameter Y to terminal 2.

In line 825h, the terminal 2 requests the secure application module 3 to verify the content of data D' on record number RN'.

In line 825h, the secure application module 3 receives the service code S', the data D', the record number RN', and the parameter Y.

In line 825i, the secure application module 3 computes a Boolean parameter R in accordance with:

$$R:=\text{Bool}(S'==S)$$

In line 825j, the secure application module 3 checks whether R=true.

The secure application module 3 stores the service code S', the data D', and the record number RN' in its memory, line 825k. Those bits of the data D' which must remain unchanged, i.e. D'.fixed, is automatically retrieved from the data D' by the secure application module 3 and stored in its memory, line 825l.

Then, in line 825m, the secure application module computes a parameter X in accordance with:

$$X:=MAC(RND3,S',D',M')Ks1$$

Thus, the content of parameter X is computed by processing the parameters RND3, S', D', M' with a message authentication code (MAC) by using key Ks1.

If keys Ks1 on the integrated circuit card 1 and the secure application module 3 are the same, the values of X and Y are to be the same. This is checked in the steps carried out in lines 825n and 825o, by first computing a Boolean parameter R in accordance with:

$$R:=\text{Bool}(X==Y)$$

and then checking whether R=true.

In line 825p the value of Boolean parameter R is transmitted to the terminal 2, where its content is checked.

Thus, after the method steps shown in lines 825a–825p, the part D'.fixed of data D' which is to remain unchanged, is read out from the integrated circuit card 1 in a secure way and stored in secure application module 3.

Now, the service action request and authorization phase mainly follows the same steps as have been illustrated in line 826–838 of FIG. 8a. However, in line 830 the terminal only requests the secure application module an authorization to write the variable part D.var of data D in record number RN. Moreover, the step carried out in line 837 in FIG. 8a, which has been renumbered into line 837b in FIG. 8b, is preceded by an additional step of calculating data D in accordance with the following formula:

$$D:=D'.\text{fixed}+D.\text{var}$$

Thus, the fixed part D'.fixed of data D equals the fixed part D'.fixed of the former data D', since it has been previously read in the method steps carried out in lines 825a–825b and has been included into the new data D used in the service action execution phase shown in lines 840–847.

When comparing the flow diagrams of FIGS. 2, 8a, and 8b the following differences between the prior art in which no use of directories and files is made and the present invention are:

the integrated circuit card 1 comprises no tables with application identifiers/pass words, access rights and pointers to memory zones;

the application access rights A are stored on the secure application module 3;

use is made of two keys Ks1 and Ks2 in the integrated circuit card 1 whereas three keys Ks1, Ks2 and Ksam are stored in the secure application module 3;

directory and file structures are used on the integrated circuit card 1 to support a security architecture;

records and record numbers are used within the file structures to provide a security architecture on the level of different services and service providers;

the check whether terminal 2 is authorized to carry out a certain service action on the integrated circuit card 1 is carried out by the secure application module 3 and not by the integrated circuit card 1, thus saving memory space in the latter.

Figure 9:
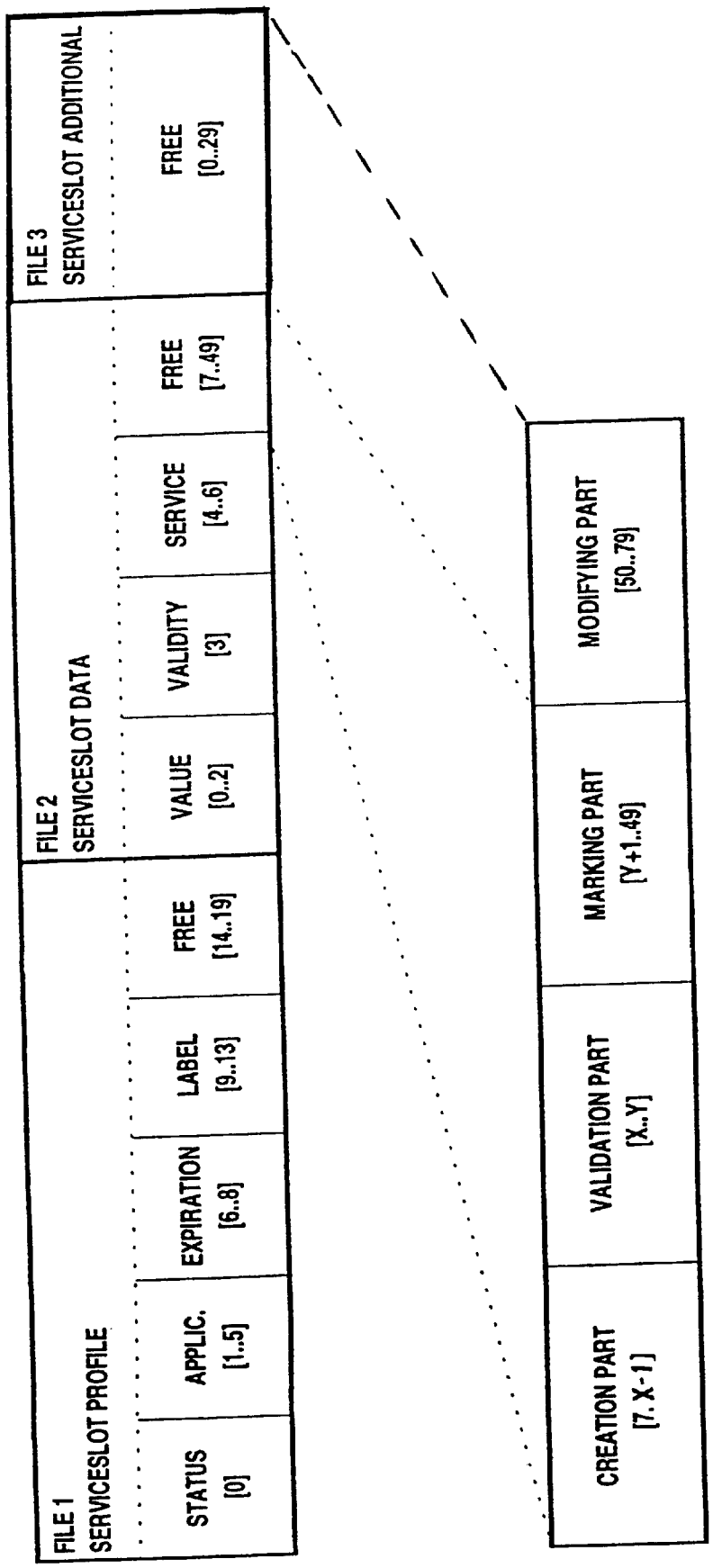
FIG. 9 shows an example of the exact structure of a service slot.

FIG. 9 shows one possible exact structure of a service slot. The service slot is divided into three parts: file 1, file 2, and file 3 (optionally). File 1 comprises the service slot profile and is provided with status, application code, expiration date, application label (text) and some free bits. These free bits may, e.g., be used for further data for the service provider.

File 2 comprises the service slot data and is provided with the value (e.g. price of a ticker or a loyalty counter), validity, service code, and some free bits. The validity bits are used to indicate whether the service object is still valid, e.g., whether a coupon or ticket can still be used.

Since the service actions creating, validating, and marking are only allowed to change a variable part D.var of the data D, the free bits of file 2 of the service object are divided into a creation, validation, and marking part. The creation part is written once when creating an object, the validation part is written a limited number of times, depending on the value of the validity counter, whereas the marking part can be written an unlimited number of times.

File 3 comprises a predetermined number of free bits to be used to store additional service slot data.

In an alternative embodiment of the invention, a provision is made to temporarily store data from a service slot in an integrated circuit card into a memory of a third party. The third party may be the service provider but can, alternatively, be a bank, a notary or a card issuer. Such a provision may be useful when the card holder has, e.g., bought a ticket for a concert months before the concert will be given and the card holder does not want to loose his ticket.

Storing the data from the service slot in the integrated circuit card into the third party memory must take place in a secure way.

In order to carry out such a temporarily storage the third party will use the standard service slot functionality, however, without the restriction determined by the unique application identifier stored in the definition part and the service identifier stored in the data part. The third party must be provided with a secure application module arranged to read the data (i.e., slot definition, slot data and additional slot data), to verify the service slot, and to write data (create a service slot and erase a service slot).

The following steps are to be carried out for such an additional service.

The relevant data must be securely read out from the integrated circuit card concerned which includes the following substeps:

reading out the integrated circuit card ID;

selecting the service slot related to the integrated circuit card ID;

reading and verifying the service slot data, service slot definition, and, if applicable, additional service slot data;

storing a stamped MAC and random number of the service slot definition and the service slot data in order to allow a.o. the card holder to prove that the card service slot concerned was provided with the data to be temporarily stored in the third party memory; a time stamp could be used as a random number;

securely storing the ID, service slot definition, service slot data and additional service slot data, if present, in a third party memory;

erasing service slot and releasing service slot definition in the integrated circuit card.

When the card holder wishes to have his data retransmitted from the third party memory to his card, the next steps need to be carried out:

verifying the user PIN, if required;

verifying whether the data in the third party memory was read out from the integrated circuit card concerned by checking whether the stored ID equals the integrated card ID;

selecting a free service slot;

allocating a free service slot with a service slot definition;

writing service slot data, and possibly additional service slot data in the selected free service slot (create service slot, possibly modify service slot), and erasing the third party memory.

In a further alternative embodiment, instead of transferring the content of a service slot to a third party memory, one could lock a service slot on the integrated' circuit card itself. This could be done by a Tele-chipper® or through Internet, e.g., by changing the content of a bit in the service slot definition. Then, the use of this service slot would be temporarily blocked, e.g., until the date a concert actually takes place.

What is claimed is:

1. An integrated circuit card comprising a memory storing service data relating to at least two services, the integrated circuit card to be used with a secure application module that contains service data relating to at least one of the at least two services, wherein:

at least part of the memory comprises data in file structures within one directory including at least a first file and a second file;

the service data for each service is grouped together in a service slot;

each service slot is divided into a profile part and a data part;

each profile part has a slot number, comprises an application identifier, and is arranged to function as an authorization mechanism;

each data part comprises data related to a given service, and a service identifier to identify a service type;

the first file comprises the profile part of all of the service slots;

the second file comprises at least a portion of the data part of all of the service slots; and the memory stores at least one key to protect write access to each service slot in the first and second files.

2. An integrated circuit card according to claim 1, wherein at least one profile part also comprises data relating to an expire date.

3. An integrated circuit card according to claim 1, wherein at least one profile part also comprises data relating to an application status.

4. An integrated circuit card according to claim 1, wherein:

each service slot comprises its own distinct profile part and its own distinct data part;

the first file is divided in a first plurality of records with each distinct profile part forming one record of the first plurality of records;

the second file is divided into a second plurality of records with each distinct data part forming one record of the second plurality of records; and the memory means stores a further key to protect access to the first file.

5. An integrated circuit card according to claim 1, wherein:

the profile parts of a plurality of service slots coincide to form one common profile part and the data parts of the plurality of service slots are distinct;

the common profile part forms one record of the first file; and the second file comprises a plurality of records each corresponding to a respective one of the distinct data parts.

6. An integrated circuit card according to claim 1, wherein said directory also comprises a third file and at least one service slot comprises an additional data part in said third file for storing additional data.

7. An integrated circuit card according to claim 6, wherein said third file comprises a plurality of records and each additional data part forms one record of said plurality of records.

8. A secure application module for communicating with an integrated circuit card, wherein:

(i) said integrated circuit card comprises a memory storing service data relating to at least two services, wherein:

at least part of the memory comprises data in file structures within one directory including at least a first file and a second file;

the service data of each service is grouped together in a service slot;

each service slot is divided into a profile part and a data part;

each profile part has a slot number, comprises an application identifier, and is arranged to function as an authorization mechanism;

each data part comprises data related to a given service, and a service identifier to identify a service type;

the first file comprises the profile part of all of the service slots;

the second file comprises at least a portion of the data part of all of the service slots; and the memory stores at least a first key to protect write access to each service slot in the first and second files; and (ii) said secure application module comprises a memory storing service data relating to at least one of the at least two services, wherein at least part of the memory of the secure application module comprises service data in file structures within one directory, said directory comprising at least one file, and said at least one file storing data relating to said at least one of the at least two services grouped together into:

application/service definition data comprising one of said application identifiers and one of said service identifiers;

at least two application counters for administrating a number of allocations and for generating a unique record transaction number;

a service sequence counter for generating a unique object number and for administrating a number of created service objects;

a service float for administrating a number of one of issued and received value units; and application/service access conditions defining service actions allowed to be performed by said secure application module;

wherein the memory of the secure application module comprises said first key and a second key, said first key being used to protect data communication with the integrated circuit card, and said second key being used by said secure application module to store said application/service definition data and said application/service access conditions.

9. A secure application module according to claim 8, wherein said memory means of the secure application module stores a third key for protecting data communication with the integrated circuit card.

10. A system comprising:
(A) secure application module for communicating with an integrated circuit card, wherein:
(i) the integrated circuit card comprises a memory storing service data relating to at least two services, wherein:
at least part of the memory comprises data in file structures within one directory including at least a first file and a second file;
the service data of each service is grouped together in a service slot;
each service slot is divided into a profile part and a data part;
each profile part has a slot number, comprises an application identifier, and is arranged to function as an authorization mechanism;
each data part comprises data related to a given service, and a service identifier to identify a service type;
the first file comprises the profile part of all of the service slots;
the second file comprises at least a portion of the data part of all of the service slots; and
the memory stores at least a first key to protect write access to each service slot in the first and second files; and
(ii) said secure application module comprises a memory storing service data relating to at least one of the at least two services, wherein at least part of the memory of the secure application module comprises service data in file structures within one directory, said directory comprising at least one file, and said at least one file storing data relating to said at least one of the at least two services grouped together into:
application/service definition data comprising one of said application identifiers and one of said service identifiers;
at least two application counters for administrating a number of allocations and for generating a unique record transaction number;
a service sequence counter for generating a unique object number and for administrating a number of created service objects;
a service float for administrating a number of one of issued and received value units; and
application/service access conditions defining service actions allowed to be performed by said secure application module;
wherein the memory of the secure application module comprises said first key and a second key, said first key being used to protect data communication with the integrated circuit card, and said second key being used by said secure application module to store said application/service definition data and said application/service access conditions; and (B) at least one terminal coupled to the secure application module, said terminal being equipped to communicate with said secure application module and with the integrated circuit card in order to control a service action carried out on the integrated circuit card.

11. A method for controlling a service action to be carried out by a terminal on an integrated circuit card, said terminal being coupled to both a secure application module and to the integrated circuit card, wherein:
(i) the integrated circuit card comprises a memory storing service data relating to at least two services, wherein:
at least part of the memory comprises data in file structures within one directory including at least a first file and a second file;
the service data of each service is grouped together in a service slot;
each service slot is divided into a profile part and a data part;
each profile part has a slot number, comprises an application identifier, and is arranged to function as an authorization mechanism;
each data part comprises data related to a given service, and a service identifier to identify a service type;
the first file comprises the profile part of all of the service slots;
the second file comprises at least a portion of the data part of all of the service slots; and
the memory stores at least a first key to protect write access to each service slot in the first and second files; and
(ii) said secure application module comprises a memory storing service data relating to at least one of the at least two services, wherein at least part of the memory of the secure application module comprises service data in file structures within one directory, said directory comprising at least one file, and said at least one file storing data relating to said at least one of the at least two services grouped together into:
application/service definition data comprising one of said application identifiers and one of said service identifiers;
at least two application counters for administrating a number of allocations and for generating a unique record transaction number;
a service sequence counter for generating a unique object number and for administrating a number of created service objects;
a service float for administrating a number of one of issued and received value units; and
application/service access conditions defining service actions allowed to be performed by said secure application module;
wherein the memory of the secure application module comprises said first key and a second key, said first key being used to protect data communication with the integrated circuit card, and said second key being used by said secure application module to store said application/service definition data and said application/service access conditions;

said method comprising:

establishing on the secure application module whether the secure application module is allowed to carry out the service action on said integrated circuit card by using said first key, said application/service definition data and said application/service access conditions;

carrying out the service action on the integrated circuit card; and checking on the terminal whether the service action has been carried out on the integrated circuit card.

12. A method according to claim 11, wherein prior to establishing on the secure application module whether the secure application module is allowed to carry out the service action on the integrated circuit card, given service data is read from a given service slot on the integrated circuit card and a predetermined part of the given service data which has to remain unchanged is stored in the secure application module, and wherein the service action is carried out on the integrated circuit card without changing the predetermined part of the given service data in the given service slot on the integrated circuit card.

13. A method according to claim 11, wherein the service action comprises:

reading out an integrated circuit card ID;

selecting a given service slot associated with the integrated circuit card ID;

reading and verifying at least service slot data and a service slot definition;

storing a stamped MAC and a random number of the service slot definition and the service slot data;

securely storing the integrated circuit card ID, the service slot definition and the service slot data in a third party memory; and erasing the service slot data and releasing the service slot definition.

14. A method according to claim 13, wherein the service action further comprises:

verifying whether the data in the third party memory was read out from the integrated circuit card by checking whether the stored integrated circuit card ID equals the integrated circuit card ID:

selecting a free service slot in the integrated circuit card;

allocating a free service slot with a new service slot definition in the integrated circuit card;

writing new service slot data in the selected free service slot; and erasing the third party memory.

15. A method according to claim 11, wherein a given service slot on the integrated circuit card is temporarily locked.

* * * * *